Patented May 13, 1924.

1,493,643

UNITED STATES PATENT OFFICE.

GILBERT H. PEARSALL, OF NEW YORK, N. Y., ASSIGNOR TO FLUE WELDER CORPORATION, OF ALBANY, NEW YORK, A CORPORATION OF NEW YORK.

APPARATUS AND PROCESS FOR WELDING TUBULAR BODIES.

Application filed March 24, 1916. Serial No. 86,350.

*To all whom it may concern:*

Be it known that I, GILBERT H. PEARSALL, a citizen of the United States, and resident of New York, in the county of New York and in the State of New York, have invented a certain new and useful Improvement in Apparatus and Process for Welding Tubular Bodies, and do hereby declare that the following is a full, clear, and exact description thereof.

My invention relates to an apparatus and process for welding tubular bodies and has for its object to weld tubular pieces end to end of any diameter or length such, for example, as pipes, tubes, or flues, or to form, shape, or weld such bodies in any desired manner.

A further object of my invention is to weld tubular bodies end to end so that the external or internal diameter of the welded portions may be of any desired dimension.

A further object of my invention is to take out distortions in tubular bodies.

The welding of tubular bodies end to end has been accomplished heretofore by an internal die or anvil and external hammers or rollers. The internal die or anvil necessarily must be smaller than the tubular body in order to permit the removal of the tubular body from the internal die or anvil after the tubular body has cooled. This causes the welded portion to be smaller in diameter than the rest of the tubular body, which is objectionable. In boiler flues, for example, the restricted portion causes an increase in velocity of the gases at the restricted portion, thereby reducing their heating effect.

Other and further objects of my invention will be apparent from the following description and from an examination of the accompanying drawings of one embodiment thereof in which Figure 1 is a side elevation of said embodiment, partly in section;

Figure 2 is a plan of the embodiment shown in Figure 1, partly in section;

Figure 3 a vertical section taken on the line 3—3 of Figure 1 looking in the direction of the arrows; and Figure 4 an end elevation of the embodiment shown in Figure 1 looking from the left of said figure.

Similar reference characters refer to similar parts throughout the drawings.

The embodiment illustrated in the drawings comprises a die or clamping head 1 having any desired number of die segments 2. Each segment 2 is provided on one contacting side with a pin 3 (Fig. 3) and on the other contacting side with a slot 4, the pin 3 of one segment being adapted to work in the slot 4 of the adjacent segment in order to insure proper alignment of the segments.

Each die segment 2 preferably is connected to a piston rod 5 of a piston 6 in a cylinder 7. Fluid or gas is supplied to the cylinders by an inlet pipe 8 and is carried away by an outlet pipe 9, the cylinders being connected by passages 10. Compressed air has been found to furnish a satisfactory piston operating medium. A spring 11 normally maintains the piston in such position as to hold the segments in open or inoperative position. Inlet pipe 8 is connected to a pipe 13 having a valve 14 therein and leading to a source of fluid or gas supply, by a flexible connection 12. Die or clamping head 1 and the furnace 60 preferably are mounted on wheels 15 engaging a track 16 (if desired) so that said die and said furnace can be moved with reference to the rest of the apparatus, in order to accommodate varying lengths of tubular bodies, in manner to be described hereinafter.

Within the open space of die 1 is an expanding head 20 of any desired type, mounted on a hollow shaft 22, which shaft preferably is detachably secured to an elongated sleeve 23, as by screw threads (Fig. 2). In the embodiment illustrated, expanding head 20 is of the expanding roller type with rollers 21 (Fig. 1). Sleeve 23 (Fig. 2) has a gear 24 loosely mounted thereon provided with a clutch member 25. Gear 24 meshes with a pinion 26 fixed on a shaft 27 on which also is fixed a gear 28 which meshes with a pinion 29 (Fig. 1) on a shaft 30 of motor 31.

On said elongated sleeve 23 (Fig. 2) is splined a sliding clutch member 32 adapted to cooperate with clutch member 25 of gear 24. Said clutch member 32 is operated by a bell crank lever 33 (Fig. 1) connected to a piston rod 34 of a piston 35 in the cylinder 36. A pipe 37 to said cylinder operates said piston, a spring 38 tending normally to maintain said piston in such position that the clutch members 25 and 32

May 13, 1924. 1,493,644

H. F. PHEE

JOURNAL BEARING

Filed July 2, 1923 2 Sheets-Sheet 2

Inventor.
Henry F. Phee
by Jas. H. Churchill
att'y.

Patented May 13, 1924.

1,493,644

UNITED STATES PATENT OFFICE.

HENRY F. PHEE, OF BOSTON, MASSACHUSETTS, ASSIGNOR TO EDWARD H. PHEE, OF CHICAGO, ILLINOIS.

JOURNAL BEARING.

Application filed July 2, 1923. Serial No. 648,976.

*To all whom it may concern:*

Be it known that I, HENRY F. PHEE, a citizen of the United States, residing in Boston, in the county of Suffolk and State of Massachusetts, have invented an Improvement in Journal Bearings, of which the following description, in connection with the accompanying drawings, is a specification, like characters on the drawings representing like parts.

This invention relates to a bearing, and more particularly to a so-called top bearing of the type used with the journals of electric and steam railway cars, automobile trucks and the like, and has for an object to provide a self-oiling bearing of novel and improved construction in which all parts of the bearing are efficiently and thoroughly lubricated, enabling the bearing to withstand wear for long periods of time without liability of burning or overheating. A further object of the invention is to provide an oiling device for a so-called top bearing of novel and improved construction, adapted to perform its intended function for long periods of time without repair or attention, and which, in addition, may be easily adapted and applied to the bearings at present used in electric and steam railway cars.

To these ends the improved bearing is provided with an oil reservoir and with means cooperating therewith for supplying oil to the journal member, comprising preferably a plurality of layers of wool felt yieldingly held against the under side of the journal member, a portion of one layer being immersed in the oil in the oil reservoir to draw the oil up to the remaining layers. The oil thus supplied to the rotating journal member is carried upwardly thereby and provision is made for distributing it between the top bearing and the journal member. To this end the bearing is preferably provided with a plurality of sockets or recesses in its bearing surface, and with oil grooves connecting the sides of the bearing with such sockets or recesses. The sockets or recesses may and preferably will be filled with fibrous material, and the oil grooves will for the best results be arranged tangentially with respect to such sockets or recesses so that the oil forced through the oil grooves by the rotating journal member forms in such sockets or recesses eddy currents which operate to diffuse the oil laterally over the entire bearing surface, and to thereby thoroughly lubricate the same.

In the drawings illustrating the preferred form of the invention, Fig. 1 is a vertical longitudinal section of a bearing of the character used on electric railroad work and embodying the present invention;

Figure 2:
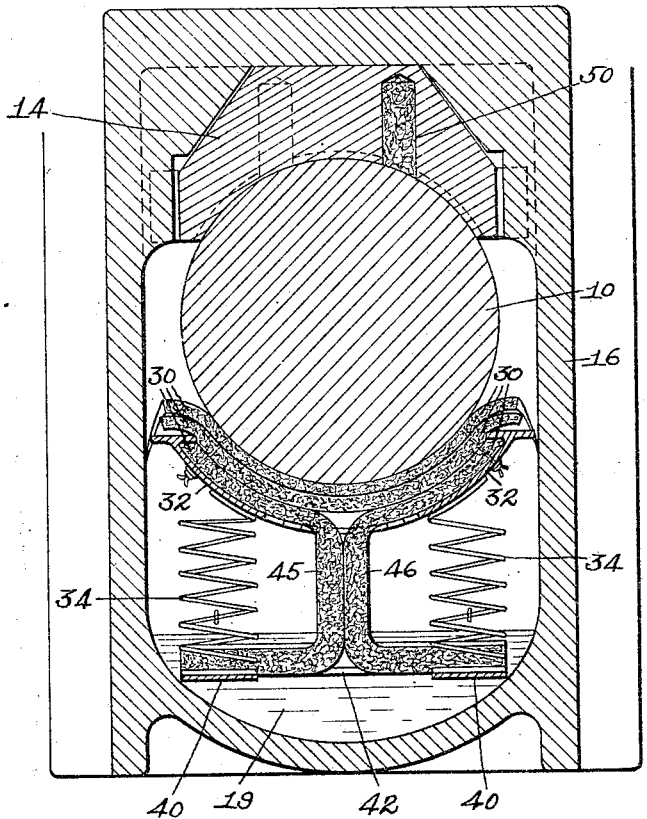
Fig. 2 is a cross section on line 2—2 of Fig. 1.

Referring to the drawings, 10 represents a journal member, herein shown as formed upon the end of a car axle 12 of an electric or steam railway car, and with which a top bearing member 14 cooperates to support the weight of the car upon the axle. The top bearing member 14 may and preferably will be housed within a journal box 16, herein shown as of usual construction, and which is connected in the usual manner, not shown, to the body of the electric or steam railway car, and through which the weight of the car is transmitted to the top bearing member 14 and thence to the journal member 10. The journal box 16 may and preferably will be constructed to provide a reservoir 18 below the journal member 10 for containing a body 19 of oil, the latter being poured into the reservoir through the mouth 20 of the journal box at intervals to maintain an adequate supply therein, and during the normal operation of the electric or steam railway car the mouth 20 of the journal box is closed by the usual removable cover, not shown.

Provision is made for supplying the rotating journal member 10 with oil from the reservoir 18, and for this purpose an improved oiling device may and preferably will be employed. As herein shown, the improved oiling device comprises a plurality of layers 30 of wool felt supported upon a curved oil pan or plate 32 by a plurality of coil springs 34, arranged in two rows so as to yieldingly maintain the uppermost layer of the wool felt in contact with a relatively large area or portion of the under side of the journal member 10. The lower ends of the coil springs are arranged to rest upon an open frame work comprising longitudinal plates 40 and cross plates 42 arranged to rest upon the curved bottom of the oil reservoir 18.

The felt comprising the lowermost layer of the plurality of layers 30 may and preferably will be composed of two parts 45, 46, the free ends of which are extended through a central opening in the pan or plate 32, and rest upon the side bars of the spring supporting frame 40, 42, as shown in Fig. 2, and in a position in which they are immersed in the oil 19 in the oil reservoir.

The ends of the uppermost layer of the wool felt layers 30 may and preferably will be extended down into the body of oil in the oil reservoir 18, as shown in Fig. 1. By means of the portions of the wool felt layers immersed in the body of oil, clean and filtered oil is drawn by capillarity upwardly through the end portions of the layers and conveyed to the mass of wool felt in contact with the under side of the journal member 10, so that the same is saturated with oil and as a result an ample supply of clean oil is continuously applied to the rotating journal member 10 to be carried upwardly by the latter.

Figure 3:
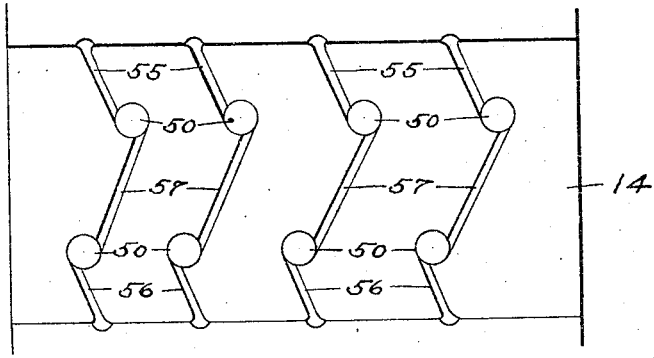
Fig. 3 is a plan of the top bearing inverted.

Provision is made for distributing the oil thus carried up by the rotating journal member between the journal member and the bearing surface of the top bearing 14 so as to thoroughly lubricate all parts of the latter. For this purpose the bearing 14 is provided with one or more sockets or recesses 50 extending from the bearing surface upwardly into the body of the bearing to provide reservoirs for the accumulation of oil. The sockets or recesses 50 are preferably arranged in a double row, as shown in Figs. 1 and 2, and are filled with fibrous material preferably wool felt. Oil grooves are provided in the bearing surface from the sides of the bearing to the sockets 50, and as herein shown, one set of oil grooves 55 is arranged to extend from one side of the bearing to the sockets or recesses in one row, and a second set of oil grooves 56 is arranged to extend from the opposite side of the bearing surface to the sockets or recesses in the second row. The sockets in each row are connected as indicated in Fig. 3 by oil grooves 57, and in order to disperse the oil from the several oil sockets or reservoirs over the entire bearing surface, the oil grooves may and preferably will be arranged tangentially with respect to the oil reservoirs, as shown in Fig. 3. In addition, the different sets of oil grooves may and preferably will be staggered with relation to one another. With this construction, as the oil is forced through one set of grooves from one side of the bearing, it enters the oil reservoirs in one row at an offset or tangential point, and operates to produce an eddy current at each oil reservoir. The swirling motion of the eddy current operates to diffuse the oil over the area of the bearing surface surrounding the socket or reservoir, and by the provision of a sufficient number of oil reservoirs in a bearing of a given size it is possible to insure the uniform distribution of the oil over the entire bearing surface.

With the prior constructions of bearings and oiling devices used upon the journals of electric and steam railway cars, considerable difficulty has been experienced in distributing the oil between the top bearing and the rotating journal. Usually a plain brass bearing member is provided, and the space within the journal box below the rotating journal is packed with loose waste or wool felt saturated with oil. As the journal wears upon the wool felt the oil gradually sinks to the bottom of the journal box, and in a short while the wool felt becomes more or less dry and an insufficient supply of oil is transmitted to the journal. In addition, the wear upon the wool felt packing causes the formation of fine particles of dirt which, together with the dirt, which naturally finds its way into the journal box, is carried up between the journal and top bearing, soon scoring and destroying the bearing surface, and also heats and cuts the journal itself.

With the present construction of bearing and oiling device, filtered oil is continually supplied in large and ample quantities to the rotating journal. The filtered oil carried up by the rotating journal is then conducted through the oil grooves without clogging the latter and accumulates in the various oil reservoirs located in the bearing at different points over the bearing surface. The formation of the eddy currents as above described assists in the distribution of the oil, and experience has shown that bearings embodying the present invention may be run without attention or repair for relatively long periods of time, and without using but a fraction of the quantity of oil heretofore employed.

It will also be observed that the oiling unit by which the oil is conveyed from the oil reservoir and supplied to the under surface of the rotating journal member is adapted to be applied directly to existing bearings of the type at present used in electric and steam railway work. The plate, springs, spring supporting frame, together with the several wool felt layers may be inserted as a unit through the mouth of the journal box and positioned below the journal with a minimum effort and in a minimum time.

The sockets or recesses 50 form auxiliary oil wells in the top bearing 14 and by providing these auxiliary wells with absorbent material, a relatively large quantity of oil may be accumulated within the bearing itself, and which is maintained at a substantially constant volume as long as oil is present in the journal box or reservoir 18, and in case the oil in the main reservoir should become exhausted by neglect or oversight, oil will then be supplied to the bearing surface and the journal 10 from the auxiliary wells in the bearing member, thereby avoiding damage to the bearing and to the journal for a substantial length of time, in case of neglect or oversight on the part of the operator whose duty it is to fill the main reservoir with oil.

While the preferred embodiment of the invention has been illustrated and described, it will be understood that the invention may be embodied in other forms within the scope of the following claims:

1. The combination with a car axle journal and journal box therefor having its lower portion forming an oil well below said journal, of a top bearing for said journal, a layer of fibrous material engaging the lower surface of said journal and having a wick member depending therefrom below the journal and into the oil in the said oil well to lift the oil therefrom, filter it and supply said fibrous layer with clean oil, and means for yieldingly maintaining the fibrous layer in contact with the under surface of said journal.

2. The combination with a car axle journal and a journal box therefor having its lower portion forming an oil well, of a top bearing for said journal of substantial thickness and having channels in its lower surface and provided with sockets extended from said lower surface but partially through said bearing, a layer of fibrous material engaging the lower surface of said journal above the level of the oil in said oil well and having a wick member depending therefrom below the journal and into the oil in said oil well, and yielding means located below the journal for supporting the fibrous layer above the oil well and for maintaining it in contact with the under surface of the journal.

3. The combination with a car axle journal and journal box therefor having its lower portion forming an oil well below said journal, of a top bearing for said journal, a pad of fibrous material engaging the lower surface of said journal and having a wick member depending therefrom below the journal and into the oil in said oil well, a support for said pad located below said journal, and springs below said support to sustain the latter and to yieldingly maintain the pad in engagement with said journal.

In testimony whereof, I have signed my name to this specification.

HENRY F. PHEE.